UNITED STATES PATENT OFFICE

2,428,357

METHOD OF REDUCING REFLECTION OF A TRANSPARENT BODY

Morris U. Cohen, Brooklyn, and Joseph Steigman, New York, N. Y.

No Drawing. Application October 15, 1942, Serial No. 462,454

1 Claim. (Cl. 117—124)

Our invention relates to the art of applying a transparent film or coating to a transparent body for the purpose of altering its optical and surface properties. Such films have been applied for the purpose of reducing surface reflection and increasing light transmission through glass and like material. We contemplate the use of our invention for this purpose and, in addition, we propose to alter the surface properties of the body to which the film is applied by rendering such surface non-fogging.

The art of modifying the optical and surface properties of transparent bodies (such as lens systems in binoculars, periscopes, fire control apparatus, photographic equipment; and glass and plastic surfaces used as windows, etc.) is one which has many important applications; but the utilization of methods heretofore suggested has been exceedingly limited. The principal difficulty has been the lack of a simple and effective method, generally applicable, of applying films having the desired properties.

Our invention provides a method which is simple in procedure, accurate in control and capable of widespread use. It provides uniform, abrasion-resistant films of high stability and durability which not only reduce reflectance and increase light transmission but which render the surface to which they are applied non-fogging. Using our method, abrasion-resistant films having the desired characteristics may be applied to small and large areas and to all types of glass surfaces and to transparent plastics, such as polymethylmethacrylate. We believe our invention provides a basis upon which the art of applying transparent films to transparent bodies may be opened up to significant use.

Our invention consists essentially in applying a transparent reflectance reducing and/or non-fogging film by the deposition onto the surface of a transparent body of a uniform film of a colloidal dispersion or solution comprising silicic acids or silicates or complexes thereof, followed by drying of the film.

Our invention is based on the discovery that the optical and surface characteristics of a silicate in the mass undergo marked changes when dispersed or dissolved and formed as exceedingly thin surface films (in the order of wave lengths of light or fractions thereof) upon a transparent body such as glass. We have found that these phenomena can be controlled and, in accordance with our invention, reproducible films having desired characteristics are produced by simple deposition, as by dipping or spraying, followed by drying.

Examples of silicon compounds which may be employed are the alkali metal (including ammonium) silicates and metasilicates, the alkyl silicates such as ethyl silicate, silicon tetrachloride, and silane ($SiH_4$). Of these the sodium and potassium silicates are preferred and especially the metasilicates since these are crystalline compounds from which standardized dispersions or solutions, aqueous or the like, may be made at will.

In accordance with our invention, we control the thickness, uniformity, refractive index, abrasion-resistance, hardness, adherence, stability and non-fogging characteristics of films formed from depositions of silicate dispersions or solutions by adjustment of the concentration of the dispersion or solution; by adjustment of the surface tension, wetting power, detergent power, and contact angle of the dispersion or solution; by adjustment of the pH of the dispersion or solution; by adjustment of the cation or anion type present in the dispersion or solution; by adjustment of the cation and anion types present in the film; and by heat-treatment of the film as it is being formed and after it has been formed.

It is known that films applied to a surface to reduce reflectance and increase the transmission of light should have a thickness in the order of one-fourth the wave length of the light desired to be transmitted or an odd multiple thereof and that the refractive index of such film should approach the geometric mean of the index of the surface to which the film is applied and that of the atmosphere. For non-fogging films the index is not critical; but the thickness of the films must be of such order as to adhere completely to the surface to which the film is applied.

Examples of films and processes of our invention are as follows:

*Example 1.*—A dispersion or solution is prepared by stirring together water and water glass ("S" Brand: Philadelphia Quartz Co.) to give a dispersion or solution of approximately 1% calculated as $SiO_2$ by weight. The glass surface to be coated (e. g. a lens having a refractive index of approximately 1.7) is carefully cleaned and mounted on a lifting device. The lens is then lowered into the coating dispersion or solution and withdrawn at a uniform rate (for example, approximately .1 inch per second) whereby a uniform film is deposited on the surface and is passed through a heated zone where the film is dried uniformly.

Films formed from the water glass dispersion are adherent and abrasion-resistant and have a refractive index which reduces reflectance satisfactorily when applied to high index glass. The film has good non-fogging characteristics.

*Example 2.*—A dispersion or solution is prepared by stirring together sodium metasilicate with water giving a dispersion or solution of approximately 1% calculated as $SiO_2$ by weight. The lens to be coated is immersed in the coating solution and withdrawn in accordance with the directions of Example 1.

Films formed from the metasilicate dispersion of this example are adherent and have a refractive index which reduces reflectance satisfactorily when applied to high index glass. The film has good non-fogging characteristics.

*Example 3.*—A dispersion or solution is prepared by stirring together sodium metasilicate with water to give a dispersion of approximately 1% calculated as $SiO_2$ by weight. "Aerosol OT" (American Cyanamid Co.) is added to give approximately .008% dispersion of Aerosol by weight. A lens of high refractive index is immersed in the coating solution and withdrawn in accordance with the directions of Example 1.

Films applied accordingly have markedly improved uniformity. The adjustment of the surface tension, wetting power, detergency and contact angle obtained by the addition of a surface active agent provides improved uniformity in the film and reduces defects resulting from the presence of minute foreign particles in the solution. The film has good non-fogging characteristics and is resistant to abrasion.

*Example 4.*—A dispersion or solution is formulated as in Example 3 except that the Aerosol content of the dispersion is increased ten-fold. The films are processed in accordance with the method of Example 1. A solution of this type is useful in overcoming processing difficulties resulting from the presence of minute foreign matter as films formed from a coating solution with a high Aerosol content show a marked diminution of "spots" or defects arising from the presence of minute foreign particles. A high Aerosol content of the coating solution also improves the uniformity of the film and increases the thickness of the film. Adjustment of the Aerosol content may serve also as a means of controlling the thickness of the film.

*Example 5.*—A dispersion or solution is prepared by stirring together sodium metasilicate with water and Aerosol to give a dispersion having approximately 1% $SiO_2$ by weight and approximately .008% Aerosol by weight. The pH of this dispersion is then adjusted by the addition of hydrochloric acid, to approximately 8–9 using La Motte Oleo Red B as indicator. Polished plate glass having a refractive index of approximately 1.52 is coated by carrying the glass surface through the process as described in Example 1.

Films formed from solutions in which the pH is adjusted have markedly improved reflectance reducing properties when applied to glass of low index, as in the case of the polished plate glass used in the example. This indicates that films applied from coating solutions having a pH of approximately 8 or 9 have a low index of refraction compared with films processed in accordance with the unadjusted pH of Examples 1, 2, or 3.

*Example 6.*—A dispersion or solution is prepared by stirring together water glass ("S" Brand of Philadelphia Quartz Co.) with water to give a coating solution containing 1% $SiO_2$ by weight. The pH of this solution is adjusted to between 8 and 9 by addition of HCl. Films may then be applied in accordance with the procedure of Example 1, and such films have a lower refractive index than the water glass films of Example 1.

*Example 7.*—A dispersion or solution is prepared by stirring together sodium metasilicate with water and "Aerosol OT" to give a coating dispersion having 1% $SiO_2$ by weight and an Aerosol content of approximately .008% by weight. The ion type present in the solution is then altered by the addition of about 0.7 gms. of sodium dihydrogen phosphate per 100 cc. of solution and the pH of this solution is then adjusted to approximately 8 or 9. The surface to be coated is processed as described in Example 1.

A remarkable feature of the process of this example is that the reflectance reducing properties of the resulting film are implemented by after-treatment of the film. Thus, in the present example, treatment of the film by immersion in hot or cold water followed by drying lowers reflection and increases the transmission of light through the coated surface, indicating a lowering of the refractive index of the film consequent upon after-treatment. Films undergoing such after-treatment have a high degree of stability and good non-fogging properties.

*Example 8.*—A dispersion or solution of silicic acid is prepared by the hydrolysis of ethyl silicate with water to which a small quantity of hydrochloric acid has been added. The dispersion or solution should contain about 1% $SiO_2$ by weight.

The pH of this solution is adjusted to between 8 and 9 by the addition of sodium hydroxide and the films are applied to the surface to be coated in accordance with the directions of Example 5. A film having good reflectance reducing characteristics is obtained after three dips. The addition of .008% "Aerosol OT" to the coating dispersion or solution of this example provides films which are uniform and free from surface imperfections.

*Example 9.*—A mixed dispersion or solution is prepared by stirring together potassium silicate (an initial alteration of ion type) with sodium metasilicate and water and "Aerosol OT" to give a coating dispersion having approximately 1% $SiO_2$ by weight and approximately .008% Aerosol by weight. The ion type of this dispersion is further altered by the addition of .7 gms. of sodium dihydrogen phosphate per 100 cc. of solution and the pH of the resulting solution is then adjusted to approximately 8 or 9. The surface to be coated is processed as described in Example 1 and then treated with a water rinse or immersion as described in Example 7.

*Example 10.*—A dispersion or solution is prepared by stirring together potassium silicate (Kasil) with water and Aerosol to obtain a solution having 1% $SiO_2$ by weight and .008% Aerosol by weight. For each 100 cc. of this dispersion .7 gms. of potassium dihydrogen phosphate is added and the pH of the coating solution is adjusted to between 8 and 9. Films may be applied to ordinary glass surfaces from this solution in accordance with the process described in Example 1.

*Example 11.*—A dispersion or solution is prepared by stirring together sodium metasilicate with water and Aerosol to give a coating solution containing approximately 1% $SiO_2$ by weight and .008% Aerosol by weight. Potassium dihydrogen phosphate is added to this solution (.7 gms. per 100 cc. of solution) and the pH of the resulting dispersion is adjusted to between 8 and 9. Films may be applied to ordinary glass surfaces from this solution by following the procedure in Example 1.

Films formed from silicate dispersions may be rendered abrasion-resistant by heat-treatment. If the coated surface is heat-treated (as by baking, flash-heating of the surface, or the like), they become highly abrasion-resistant. In general we find that the higher the temperature used in the heat-treatment, the more abrasion-resistant the film. Flash-heating, as by a flame or other rapid heating of the surface, give good results. Likewise, baking at various temperatures up to the softening point of the glass, for periods from a few minutes to several days, gives abrasion-resistant films; but care should be taken not to maintain heating at high temperatures for such period as to cause the film to disappear. Ageing of the films (either with or without heat-treatment) also increases their abrasion-resistance.

Our methods of controlling the concentration of silicate dispersions; their surface tension, wetting power and contact angle; pH; anion type; cation type; after-treatment of the anion-altered film; and heat treatment bear directly on the characteristics of the film and the optical and surface properties of the coated surface.

The concentration of $SiO_2$ in the silicate dispersion is a means of controlling the thickness of the applied film and its reflectance reducing properties.

For a given concentration of silicate, the number of applications required to obtain reflectance reducing films may be determined empirically. We have used coating solutions with a $SiO_2$ content of approximately 1% and not infrequently the concentration is in the order of .7%. With such concentrations we find that three applications or dips of the surface to be coated are required to obtain a reflectance reducing film where the Aerosol content is in the order of .008% by weight and the glass to be coated is polished plate glass having a refractive index of approximately 1.52. Where the $SiO_2$ concentration is increased by 1% and the Aerosol content maintained at .008% two dips or applications of films will give a film of a thickness to give reflectance reducing properties. By increasing the $SiO_2$ content to 2% and maintaining the Aerosol content at .008% a single deposition of the coating solution to the surface to be coated is sufficient to obtain a film having reflectance reducing properties.

The addition of surface active agents (such as Aerosol, Tergitol Penitrant and Nacconol) to the silicate dispersion or solution bears on the uniformity of the resulting film. Increasing the concentration of the surface active agent tends to soften the resulting film but such softness may subsequently be eliminated by heat-treatment. Any surface active agent which is stable in alkaline solution and compatible with the silicate dispersion or solution can be used with alkaline silicate dispersions and, similarly, acid-stable surface active agents may be used for acidic dispersions.

By control of the pH of the coating compositions we secure films of predetermined refractive indices as desired. Films having reflectance reducing properties may be obtained from silicate solutiins without adjustment of the pH; but markedly improved reflectance reducing properties are obtained when the silicate solution is adjusted in hydrogen ion concentration so that films of the proper index are obtained. A pH of 8 or 9 is effective for the compositions used in coating glass in the preceding examples, but adjustment may be made to obtain other pH values, depending upon the particular coating composition employed and the nature and refractive index of the surface to be coated.

Control and adjustment of anion types present in the silicate dispersion or solution provide means of controlling the stability of films formed from such solutions. For this purpose we use sodium di-hydrogen phosphate, tri-sodium phosphate, or di-sodium hydrogen phosphate; but we may also employ any of the tungstates, borates, arsenates, plumbates, aluminates, zincates, stannates and vanadates as well as other salts such as the halides, sulphates and nitrates, acetates, etc., which will form homogeneous dispersions with the silicates.

We may also vary the cation type of the coating solution. For this purpose, we use potassium silicate or potassium phosphate; and we may also employ any of the potassium, ammonium or barium salts as well as other salts which will form homogeneous dispersions with the siliceous coating solution.

We have also modified the properties and behavior of the films after they have been formed, by treatment with electrolytes such as calcium, barium, lithium, aluminum, potassium, sodium or lead salts, etc., either in solution or in the fused state.

A curious and valuable characteristic of our films is their non-fogging property. Films formed from a simple silicate dispersion or solution are non-fogging and modification of the silicate dispersion or solution by the addition of surface active agents, adjustment of the pH, and added anions or cations does not impair the non-fogging property.

In the present application we have described the deposition of the film onto a glass or a glass-like surface by immersing the surface to be coated in a silicate coating solution and withdrawing the surface from the coating solution under drying conditions.

Other methods of deposition may be used and we have found, in particular, that films may effectively be applied by spraying the coating solution onto the surface and drying the film thereon.

In processing films applied for the purpose of altering the optical and surface properties of transparent bodies it is essential that the surface be prepared for coating. To this end, the surface to be coated should be thoroughly cleaned before depositing the film thereon. Likewise, the silicate dispersion or solution employed should be as free from minute foreign particles as possible. We have found that the coating solution may be clarified by processing in a super-centrifuge or by filtering through a fritted glass filter or the like. It is also desirable to have the processing take place in an atmosphere which shall be as free of dust and other extraneous matter as possible.

What we claim is:

The method of applying a reflection reducing coating to a transparent glass body consisting of the steps of applying a clear aqueous solution of an alkali metal silicate to the surface of a transparent body as a film which when dry will have a thickness of about one-quarter of the wave length of light, said solution containing the alkali metal silicate in such concentration that the solution has an equivalent $SiO_2$ content of between about 0.7% and 2% by weight, and heating such film in situ at elevated temperatures not exceeding the melting point of the transparent glass body to which the film is applied for such time as to remove water of solution and hydration whereby the alkali metal ions and the silicate ions are retained on the surface of the transparent glass body until a hard adherent transparent coating is obtained having a lower refractive index than the alkali metal silicate used in making the coating solution.

MORRIS U. COHEN.
JOSEPH STEIGMAN.

REFERENCES CITED

The following references are of record in the file of this patent:

UNITED STATES PATENTS

| Number | Name | Date |
|---|---|---|
| 2,005,900 | Littig | June 25, 1935 |
| 2,034,987 | Morita | Mar. 24, 1936 |
| 1,581,766 | Whitmore | Apr. 20, 1926 |
| 2,207,656 | Cartwright | July 9, 1940 |
| 2,230,369 | Wise | Feb. 4, 1941 |
| 2,281,474 | Cartwright et al. | Apr. 28, 1942 |
| 2,356,553 | Weissenberg | Aug. 22, 1944 |
| 2,366,516 | Geffcken | Jan. 2, 1945 |

FOREIGN PATENTS

| Number | Country | Date |
|---|---|---|
| 524,427 | Great Britain | Aug. 6, 1940 |